United States Patent
Li et al.

(10) Patent No.: US 12,379,057 B2
(45) Date of Patent: Aug. 5, 2025

(54) FLUID CONNECTOR AND SOCKET HOUSING ASSEMBLY

(71) Applicant: BEISIT ELECTRIC TECH (HANGZHOU) CO., LTD., Zhejiang (CN)

(72) Inventors: Xiaoqiang Li, Zhejiang (CN); Min Zhou, Zhejiang (CN); Fanle Zeng, Zhejiang (CN); Hao Zeng, Zhejiang (CN); Changzheng Li, Zhejiang (CN); Mingshan He, Zhejiang (CN)

(73) Assignee: BEISIT ELECTRIC TECH (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 18/294,721

(22) PCT Filed: Aug. 2, 2022

(86) PCT No.: PCT/CN2022/109570
§ 371 (c)(1),
(2) Date: Feb. 2, 2024

(87) PCT Pub. No.: WO2023/193374
PCT Pub. Date: Oct. 12, 2023

(65) Prior Publication Data
US 2025/0020255 A1    Jan. 16, 2025

(30) Foreign Application Priority Data
Apr. 7, 2022 (CN) ......................... 202210360424.3

(51) Int. Cl.
*F16L 37/084* (2006.01)
*F16L 37/32* (2006.01)

(52) U.S. Cl.
CPC .......... *F16L 37/0841* (2013.01); *F16L 37/32* (2013.01)

(58) Field of Classification Search
CPC ....... F16L 37/0841; F16L 37/32; F16L 29/04; F16L 37/40; F16L 29/02
See application file for complete search history.

(56) References Cited

U.S. PATENT DOCUMENTS 2,263,293 A * 11/1941 Ewald ..................... F16L 37/40
251/149.6
4,483,510 A * 11/1984 Palau .................. F16L 37/0841
251/149.6

(Continued)

*Primary Examiner* — David Colon-Morales
(74) *Attorney, Agent, or Firm* — SHIMOKAJI IP

(57) ABSTRACT

A socket housing assembly includes a first socket housing (205) with a threaded connection section and a notch portion; a control block (203) inserted into the first socket housing from the first end of the first socket housing along the notch portion; a control block spring (204), provided in the first socket housing and pressed against the inner wall of the first socket housing and the end of the control block; and a socket housing cover (201), having a first end used for a plug assembly and a second end having an inner wall provided with an internal thread matching the threaded connection section. The installation of the control block and the control block spring is convenient, the assembly difficulty is reduced, later repair and maintenance are facilitated, the inclination of the spring is effectively avoided, and the sealing performance of a product is guaranteed.

10 Claims, 4 Drawing Sheets

(56) References Cited

U.S. PATENT DOCUMENTS

| | | | | |
|---|---|---|---|---|
| 5,104,158 A * | 4/1992 | Meyer | F16L 37/0841 | 285/308 |
| 5,143,347 A * | 9/1992 | Lee | F16L 37/0841 | 285/317 |
| 5,806,832 A * | 9/1998 | Larbuisson | F16L 37/0841 | 251/149.6 |
| 6,082,401 A * | 7/2000 | Braun | F16L 37/0841 | 137/614.04 |
| 6,161,578 A * | 12/2000 | Braun | F16L 37/35 | 137/614.04 |
| 6,231,089 B1 * | 5/2001 | DeCler | F16L 37/0841 | 285/308 |
| 6,926,312 B2 * | 8/2005 | Lacroix | F16L 37/40 | 285/317 |
| 7,434,844 B2 * | 10/2008 | Kao | F16L 37/0841 | 285/317 |
| 7,469,472 B2 * | 12/2008 | deCler | F16L 37/34 | 285/285.1 |
| 8,256,743 B2 * | 9/2012 | Tiberghien | F16L 37/44 | 251/149.6 |
| 8,764,068 B2 * | 7/2014 | Frick | F16L 37/62 | 285/308 |
| 9,464,742 B2 * | 10/2016 | Taguchi | F16L 37/23 | |
| 10,975,982 B2 * | 4/2021 | Wilhelm | F16D 39/00 | |
| 11,204,120 B2 * | 12/2021 | Burdge | F16L 37/42 | |
| 11,326,729 B2 * | 5/2022 | Taguchi | F16L 37/40 | |
| 11,619,334 B2 * | 4/2023 | Langer | F16L 37/0841 | 285/66 |
| 11,635,162 B2 * | 4/2023 | Martin | F16L 37/0841 | 285/317 |
| 11,754,214 B2 * | 9/2023 | Le Quere | F16L 37/40 | 285/317 |
| 12,038,113 B2 * | 7/2024 | Truong | F16L 37/34 | |
| 12,038,115 B2 * | 7/2024 | Jacobsen | F16L 37/0841 | |
| 2021/0033235 A1 * | 2/2021 | Chen | F16L 17/032 | |

* cited by examiner

FLUID CONNECTOR AND SOCKET HOUSING ASSEMBLY

CROSS-REFERENCE TO RELATED APPLICATION

The present application claims the priority of the Chinese patent application No. 202210360424.3 filed with the China National Intellectual Property Administration on Apr. 7, 2022, titled of "Fluid Connector and Socket Housing Assembly". The entire disclosure of the above-identified application is incorporated herein by reference.

FIELD OF THE INVENTION

The present invention relates to the technical field of connectors, and particularly to a fluid connector and a socket housing assembly.

BACKGROUND OF THE INVENTION

Cooling methods commonly used in electronic devices include air cooling and liquid cooling. With the trend towards device integration and miniaturization, the cooling of electronic components directly impacts on the performance and lifespan of the devices. Liquid cooling has been widely used in electronic cooling systems since it offers advantages such as high cooling efficiency, low noise, and small space requirements. A fluid connector is an important part for connecting fluid pipelines of liquid cooling and controlling the pipeline connection, and the sealing performance and stability are very important.

An existing fluid connector typically includes a plug assembly and a socket housing assembly. The plug assembly is inserted into the socket housing assembly to establish conduction. The locking and unlocking of the plug assembly within the socket housing assembly are achieved through a control block and a control block spring. The control block and the control block spring are embedded inside the socket housing, making their installation during the product assembly inconvenient. Additionally, the spring may easily become misaligned during the installation, which affects the normal functionality of the product.

SUMMARY OF THE INVENTION

One objective of the present application is to provide a socket housing assembly that improves the convenience of installing a control block and a control block spring, reduces product assembly difficulties, and ensures the sealing performance of the product. Another objective of the present application is to provide a fluid connector including the aforementioned socket housing assembly.

To achieve the above-mentioned objectives, the present application provides a socket housing assembly, including:
- a first socket housing, provided with a threaded connection portion at a first end thereof and a notch portion penetrated through the threaded connection portion and extended along an axial direction;
- a control block, configured to be inserted into the first socket housing from the first end along the notch portion, and including an elastic pressing portion that presses against an outer side of the notch portion and seals the notch portion, and an annular limiting portion located inside the first socket housing and connected to the elastic pressing portion;
- a control block spring, placed inside the first socket housing and pressed against an inner wall of the first socket housing and one end of the control block away from the notch portion; and
- a socket housing cover, having a first end for inserting a plug assembly and a second end including an inner wall provided with an internal thread that matches the threaded connection portion.

In some embodiments, the socket housing assembly further includes a second socket housing. A first end of the second socket housing is connected to a second end of the first socket housing, and a second end of the second socket housing is configured to connect to a socket base housing.

In some embodiments, a width of the control block is smaller than an axial length of the notch portion, and the socket housing assembly further includes a limiting spacer placed between the first socket housing and the socket housing cover and pressed against the control block along the axial direction.

In some embodiments, the annular limiting portion is made of sheet metal parts or stamped parts, and the elastic pressing portion and the annular limiting portion are connected by injection molding or embedded molding.

In some embodiments, an inner wall of the first socket housing, on an side opposite to the notch portion, is provided with a positioning groove for positioning the control block spring, and/or a side of the annular limiting portion that is in contact with the control block spring is provided with a positioning protrusion for positioning the control block spring.

In some embodiments, the socket housing assembly further includes multiple sets of limiting pillars placed inside the first socket housing to limit the annular limiting portion.

In some embodiments, the multiple sets of limiting pillars includes a pair of first limiting pillars located at two sides of an outer periphery of the annular limiting portion, a pair of second limiting pillars located at two sides of a bottom of an inner periphery of the annular limiting portion, and a pair of third limiting pillars located at two sides of a top of the inner periphery of the annular limiting portion;
- the third limiting pillars is configured to limit a lower limit position of the control block when the control block is pressed, and limit an upper limit position of the control block when the control block is released.

The present application provides a fluid connector including a plug assembly and a socket assembly. The plug assembly includes a plug base housing, a plug housing, a plug spring, and a plug sealing rod, the plug sealing rod is pressed between the plug base housing and the plug housing by the plug spring;
- the socket assembly includes a socket base housing, a socket spring, a sealing block, and the socket housing assembly according to any one of the above, the sealing block is pressed between the socket base housing and the socket housing assembly by the socket spring;
- the plug housing is provided with a hollow guide pillar for inserting into the first socket housing, and an outer periphery of the hollow guide pillar is provided with an annular locking groove that locks with the annular limiting portion; when the hollow guide pillar is inserted into the first socket housing, the plug sealing rod and the sealing block move away from each other, thereby allowing conduction between the plug assembly and the socket assembly.

In some embodiments, the plug base housing and the plug housing are connected by threads, and a first sealing ring is placed between the plug base housing and the plug housing, and a second sealing ring is placed between the plug sealing rod and the plug housing.

The socket housing assembly is provided with a second socket housing, two ends of the second socket housing are respectively connected to the first socket housing and the socket base housing by threads, a third sealing ring is placed between an inner periphery of a first end of the second socket housing and an outer periphery of a second end of the hollow guide pillar, a fourth sealing ring is placed between the second socket housing and the sealing block, and a fifth sealing ring is placed between the second socket housing and the socket base housing The socket housing assembly provided in the present application is configured in the structure that the first socket housing is cooperated with the socket housing shell by threaded connection. When there is a need to install the control block and the control block spring, it is only necessary to unscrew the socket housing cover, install the control block spring in place, and then install the control block from the notch portion of the threaded connection section, so that the elastic pressing portion of the control block is pressed on the outer side of the notch portion, and the annular limiting portion is placed in the first socket housing, which significantly reduces the installation difficulty of the control block and the control block spring, facilitates the later maintenance, and effectively avoids the tilt of the control block spring, and improves the sealing performance between the control block and the notch portion.

BRIEF DESCRIPTION OF THE DRAWINGS

In order to more clearly explain the technical solution in the embodiments of the present application or the prior art, the following is a brief introduction of the drawings required to be used in the description of the embodiments or the prior art. Obviously, the drawings described below are only embodiments of the present application. For persons ordinarily skilled in the art, additional drawings may also be obtained based on the drawings provided, without any creative work.

Thereinto,

100—plug assembly, 200—socket assembly;
101—plug base housing, 102—plug spring, 103—first sealing ring, 104—plug sealing rod, 105—second sealing ring, 106—plug housing, 106a—hollow guide pillar, 106b—annular locking groove;
201—socket housing cover, 201a—internal thread, 202—positioning gasket, 203—control block, 204—control block spring, 205—first socket housing, 205a—threaded connection section, 205b—notch portion, 205c—positioning groove, 206—third sealing ring, 207—second socket housing, 208—fourth sealing ring, 209—sealing block, 210—socket spring, 211—fifth sealing ring, 212—socket base housing;
2031—elastic pressing portion, 2032—annular limiting portion;
2051—first limiting pillar, 2052—second limiting pillar, 2053—third limiting pillar.

DETAILED DESCRIPTION OF ILLUSTRATED EMBODIMENTS

The technical solution in the embodiments of the present application will be clearly and completely described in combination with the drawings attached to the embodiments of the present application. Obviously, the embodiments described are only part of the embodiments of the present application, but not all embodiments. Based on the embodiments in the present application, all other embodiments obtained by persons ordinarily skilled in the art without creative work are within the scope of protection in the present application.

In order to enable persons ordinarily skilled in the art to better understand the present application, the following is a further detailed description for the present application in combination with the attached drawings and specific implementation methods.

Figure 3:
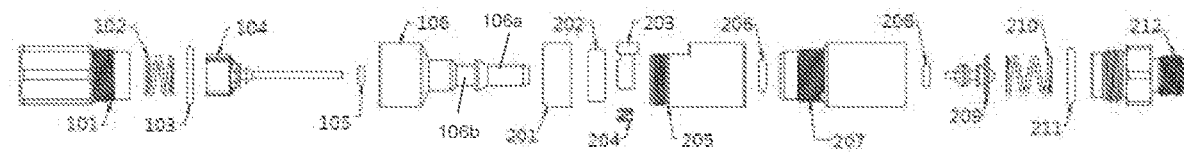
FIG. 3 is an exploded view of FIG. 1.
Figure 4:
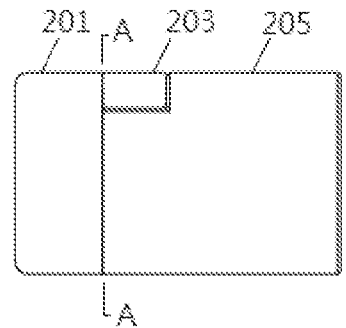
FIG. 4 is a structure diagram of a socket housing assembly provided in one embodiment of the present application.

Referring to FIGS. 3-6, a socket housing assembly provided in the embodiment of the present application mainly includes a first socket housing 205, a control block 203, a control block spring 204 and a socket housing cover 201. The first socket housing 205 is in a cylindrical structure, and has a socket housing cover 201 in an annular cap structure. The first end of the first socket housing 205, i.e., as shown the left end in FIG. 4, is provided with a threaded connection section 205a (see FIG. 6). The second end of the socket housing cover 201, i.e., the right end, is provided with an internal thread 201a (see FIG. 5) matching the threaded connection section 205a, so as to realize the screwing of the first socket housing 205 and the socket housing cover 201.

Figure 7:
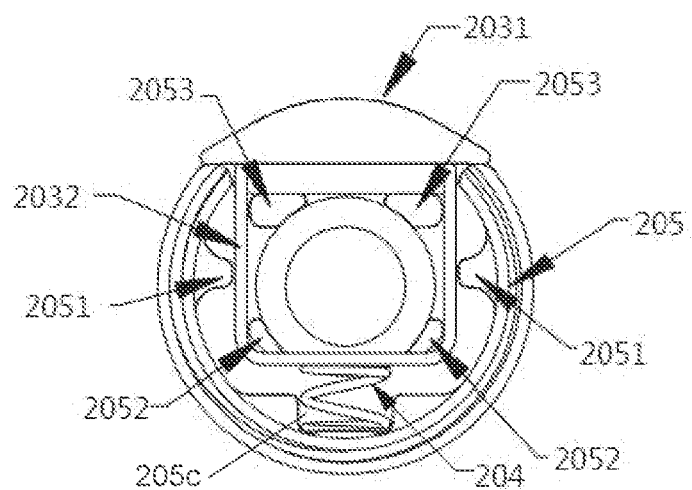
FIG. 7 is a cross section view of A-A section in FIG. 4.

The threaded connection section 205a is provided with a notch portion 205b (see FIG. 6) that extends axially along the first socket housing 205. When the socket housing cover 201 is opened, the control block spring 204 may be inserted into the first socket housing 205 from the left end face of the first socket housing 205. The control block 203 then may be inserted into the first socket housing 205 along the notch portion 205b from the left end face of the first socket housing 205. After the installation, the structure is as shown in FIG. 7. An elastic pressing portion 2031 of the control block 203 is pressed against the notch portion 205b, an annular limiting portion 2032 of the control block 203 is located inside the first socket housing 205, and the control block spring 204 is pressed against between the bottoms of the first socket housing 205 and the annular limiting portion 2032, providing an upward elastic force to the control block 203. When connecting the plug assembly 100, the elastic pressing portion 2031 is first pressed to drive the annular limiting portion 2032 downward. Once the plug assembly 100 is inserted in place, the elastic pressing portion 2031 is released. Under the reset elastic force of the elastic pressing portion 2031 and the control block spring 204, the annular limiting portion 2032 moves upward and securely locks the plug assembly 100. Throughout the pressing and releasing of the elastic pressing portion 2031, two wings of the elastic pressing portion 2031 always remain in contact with the notch portion 205b, thereby effectively ensuring the sealing performance of the product. The modular arrangements of the socket housing assembly facilitates the opening of the socket housing cover 201 for the installation of the control block 203 and the control block spring 204, thereby reducing product assembly difficulties and facilitating inspection and maintenance.

Figure 5:
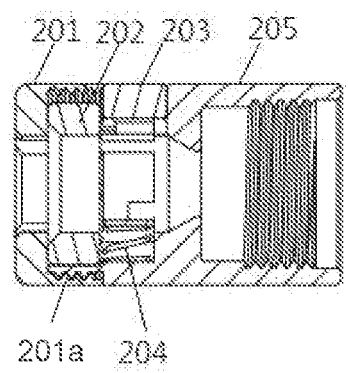
FIG. 5 is a longitudinal profile of FIG. 4.
Figure 6:
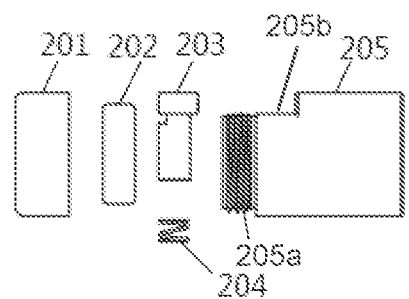
FIG. 6 is an exploded view of FIG. 4.

In the above embodiment, as shown in FIGS. 3 and 5, the width of the control block 203 is set to be smaller than the axial length of the notch portion 205b along the first socket housing 205, thereby ensuring that the control block 203 has mobility in a certain degree. Furthermore, in order to limit the control block 203 and seal the connection between the socket housing cover 201 and the first socket housing 205, the socket housing assembly further includes a positioning gasket 202. The axial widths of the positioning gasket 202 and the control block 203 are slightly smaller than the axial length of the notch portion 205b. In other words, the positioning gasket 202 is in clearance fit with the control block 203 between the socket housing cover 201 and the first socket housing 205, thereby ensuring the mobility of the control block 203 in a certain degree. The positioning gasket 202 is pressed against the control block 203 along the axial direction to prevent the control block 203 and the control block spring 204 from tilting. Additionally, the positioning gasket 202 can seal the notch portion 205b that is not covered by the elastic pressing portion 2031, thereby providing a good sealing for the connection between the socket housing cover 201 and the first socket housing 205, and improving the sealing performance of the product accordingly.

The annular limiting portion 2032 of the control block 203 is formed into a U-shape by stamping from stainless steel or galvanized plate or by sheet metal bending, which facilitates the processing and improves the efficiency. The elastic pressing portion 2031 is injection-molded or molded from elastic materials. The annular limiting portion 2032 and the elastic pressing portion 2031 are connected by injection molding or embedded molding. The arrangement of the elastic pressing portion 2031 not only prevents finger injuries during pressing but also maintains a good sealing by keeping the two wings of the elastic pressing portion 2031 in contact with the notch portion 205b. Furthermore, when the elastic pressing portion 2031 is pressed, the elastic pressing portion 2031 is deformed to absorb a certain amount of pressing force and is cooperated with the control block spring 204 to provide an elastic force for the return of the annular limiting portion 2032, thereby improving the service life of the control block spring 204.

In one embodiment, as shown in FIG. 7, the inner wall of the first socket housing 205 opposite to the notch portion 205b, i.e., the bottom inner wall shown in FIG. 7, is further provided with a positioning groove 205c. The bottom end of the control block spring 204 can be pressed into the positioning groove 205c to prevent the control block spring 204 from tilting. Furthermore, according to requirements, a positioning protrusion may be provided at the bottom end of the annular limiting portion 2032 to position the top end of the control block spring 204. As an example, the positioning protrusion may be a bulged point or a bulged pillar welded to the bottom end of the annular limiting portion 2032.

In one embodiment, as shown in FIGS. 5 and 7, the inner wall of the first socket housing 205 at the first end is further provided with multiple sets of limiting pillars. The limiting pillars are extended along the axial direction and are respectively set on the inner periphery and outer periphery of the annular limiting portion 2032 to limit the annular limiting portion 2032 and prevent the control block 203 from tilting. Specifically, the limiting pillars include a pair of first limiting pillars 2051, a pair of second limiting pillars 2052, and a pair of third limiting pillars 2053. The pair of first limiting pillars 2051 is respectively located at the left and right sides of the outer periphery of the annular limiting portion 2032. The pair of second limiting pillars 2052 is respectively located at the two sides of the bottom of the inner periphery of the annular limiting portion 2032, and configured to limit the upper limit position of the annular limiting portion 2032 when the annular limiting portion 2032 moves upward under the action of elasticity. The pair of third limiting pillars 2053 is located at the two sides of the top of the inner periphery of the annular limiting portion 2032, and configured to limit the lower limit position of the control block 203 when the control block 203 is pressed downward. As shown in FIG. 5, the length of the limiting pillars is usually smaller than the axial width of the annular limiting portion 2032.

It can be understood that the size of the notch portion 205b and the annular limiting portion 2032 (the size in the left-right direction in FIG. 7) can be flexibly adjusted. By making the size of the annular limiting portion 2032 larger than that of the notch portion 205b, it is possible to prevent the annular limiting portion 2032 from moving upward out of the notch portion 205b without the need for limiting pillars.

Figure 8:
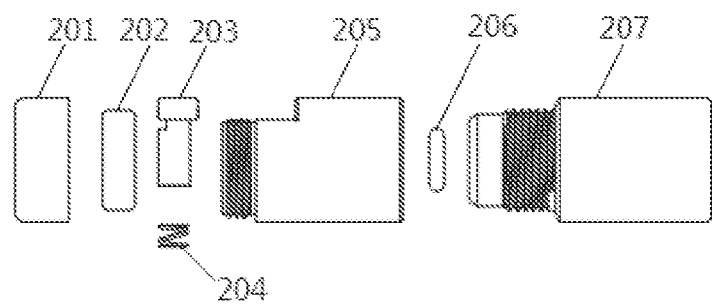
FIG. 8 is an exploded view of a socket housing assembly provided in another embodiment of the present application.

In another embodiment, as shown in FIG. 8, the socket housing assembly further includes a second socket housing 207. One end of the second socket housing 207, i.e., the left end, is connected to the first socket housing 205 through threads, and the second end of the second socket housing 207, i.e., the right end, is configured to connect to the socket base housing 212. To ensure the sealing performance of the product, the inner periphery of the first end of the second socket housing 207 is further provided with a third sealing ring 206 that matches the plug assembly 100.

Figure 1:
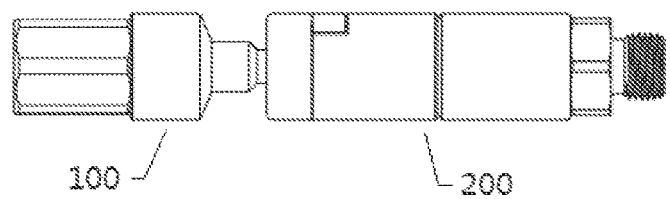
FIG. 1 is an overall structure diagram of a fluid connector provided in an embodiment of the present application.
Figure 2:
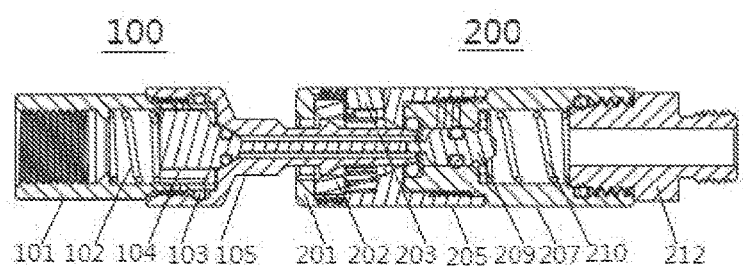
FIG. 2 is a longitudinal profile of FIG. 1.

A fluid connector is further provided in one embodiment of the present application. As shown in FIGS. 1 to 3, the fluid connector includes a plug assembly 100 and a socket assembly 200, with the socket housing assembly provided in the above embodiment being used for the socket assembly 200.

Figure 9:
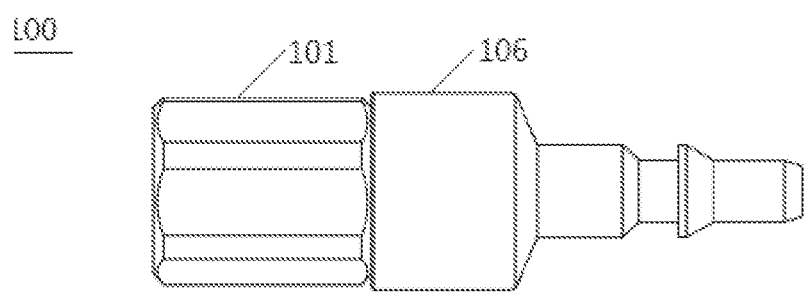
FIG. 9 is a structure diagram of a plug assembly in FIG. 1.
Figure 10:
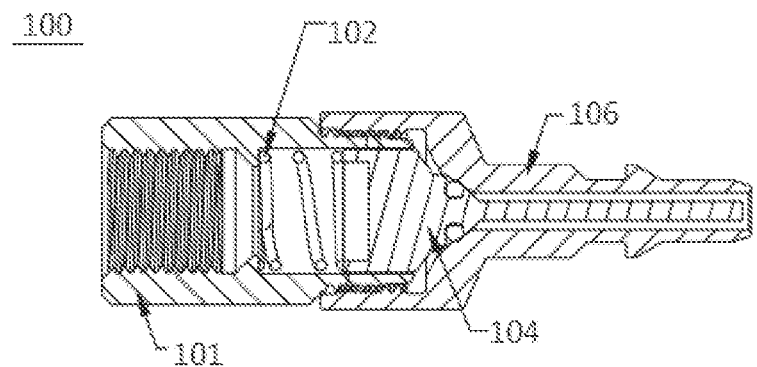
FIG. 10 is a longitudinal profile of FIG. 9.

Thereinto, as shown in FIGS. 9 and 10, the plug assembly 100 includes a plug base housing 101, a plug housing 106, a plug spring 102, and a plug sealing rod 104. The plug base housing 101 and the plug housing 106 form a cavity for accommodating the plug sealing rod 104 and the plug spring 102 and allowing fluid flow. The second end of the plug housing 106, i.e., the right end shown in FIG. 3, is provided with a hollow guide pillar 106a, and an annular locking groove 106b is provided on the outer periphery of the hollow guide pillar 106a. The plug sealing rod 104 includes a base body, a rod body, and a transition section therebetween. The outer edge of the base body is provided with a through-hole opened along the axial direction. The plug spring 102 is compressed between the base body and the plug base housing 101. The rod body of the plug sealing rod 104 is inserted into the hollow guide pillar 106a, and under the action of the plug spring 102, the transition section seals the hollow guide pillar 106a. When the hollow guide pillar 106a is inserted into the socket assembly 200, i.e., the socket housing assembly, the annular limiting portion 2032 of the control block 203 cooperates with the annular locking groove 106b of the hollow guide pillar to lock the plug assembly 100 relative to the socket assembly 200. At the same time, the plug sealing rod 104 is touched and moves towards the plug base housing 101, and the flow path of the hollow guide pillar 106a, i.e., the flow path of the plug assembly 100, is connected.

Figure 11:
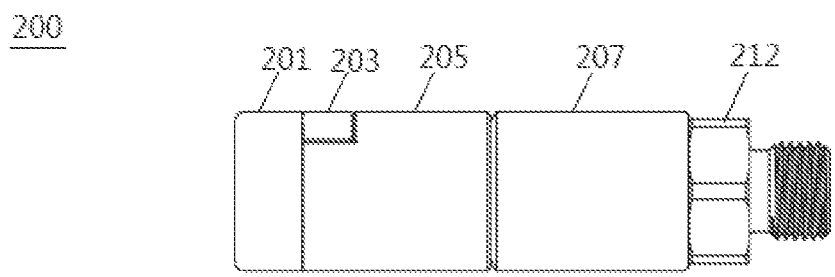
FIG. 11 is a structure diagram of a socket assembly in FIG. 1.
Figure 12:
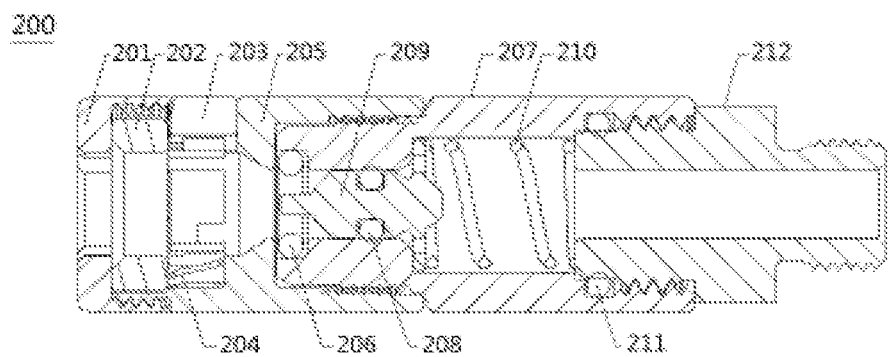
FIG. 12 is a longitudinal profile of FIG. 11.

As shown in FIG. 11 and FIG. 12, the socket assembly 200 includes a socket base housing 212, a socket spring 210, a sealing block 209 and socket housing assembly described in the above embodiments. Taking the socket housing assembly provided with a second socket housing 207 as an example, the second socket housing 207 is connected to the first socket housing 205 and socket base housing 212 to form a flow path. The sealing block 209 is pressed between the socket base housing 212 and the second socket housing 207 through the socket spring 210, and the flow path of the second socket housing 207 is blocked by the sealing block 209. The first end of the sealing block 209 is provided with a rod body. When the plug assembly 100 and the socket assembly 200 are inserted with one another, as shown in FIG. 2, the rod body of the sealing block 209 is contacted with the rod body of the plug sealing rod 104, the sealing block 209 overcomes the elastic force of socket spring 210 and moves towards the socket base housing 212, and the flow path of the plug assembly 100 is connected, thereby realizing the conduction of the fluid connector.

Continuing with FIGS. 3, 9 and 10, the plug assembly 100 further includes a first sealing ring 103 and a second sealing ring 105. The plug base housing 101 and the plug housing 106 are connected by threads, and the first sealing ring 103 is arranged between the connecting section therebetween, i.e. the outer periphery of the plug base housing 101 and the inner periphery of the plug housing 106. Due to the first sealing ring 103, the sealing of the connection between the peripheries of the plug base housing 101 and the plug housing 106 is improved. The transition section of the plug sealing rod 104 is fitted with the second sealing ring 105, thereby improving the sealing between the plug sealing rod 104 and the inner circumference of the hollow guide pillar 106a of the plug housing 106, and improving the sealing when the plug assembly 100 is not plugged into the socket assembly 200 accordingly.

Continuing with FIGS. 3, 11 and 12, the socket assembly 200 further includes a third sealing ring 206, a fourth sealing ring 208 and a fifth sealing ring 211. The third sealing ring 206 is arranged at the inner periphery of the first end of the second socket housing 207 and is attached to the outer periphery of the hollow guide pillar 106a after the hollow guide pillar 106a of the plug assembly 100 is inserted in place. The fourth sealing ring 208 is fitted around the sealing block 209 to improve the sealing performance of the sealing block 209 to the flow path of the second socket housing 207. The fifth sealing ring 211 is arranged between a connection section of the plug base housing 212 and the second socket housing 207 to improve the connection sealing and the overall sealing performance of the socket assembly 200.

It should be noted that in this disclosure, relation terms such as "first" and "second" are used only to distinguish one entity from others and do not necessarily require or imply any such actual relation or order between these entities.

The fluid connector and the socket housing assembly provided in the present application are described in detail above. In this disclosure, specific embodiments are used to explain the principle and implementation of the present application. The above embodiments are only used to assist on understanding the method of the present application and the core concept. It should be pointed out that for persons ordinarily skilled in the art, without deviating from the principle of the present application, several improvements and modifications can also be made to the present application, which also fall within the scope of protection of the claims of the present application.

What is claimed is:

1. A socket housing assembly, comprising:
    a first socket housing, provided with a threaded connection portion at a first end thereof and a notch portion penetrated through the threaded connection portion and extended along an axial direction;
    a control block, configured to be inserted into the first socket housing from the first end along the notch portion, and comprising an elastic pressing portion that presses against an outer side of the notch portion and seals the notch portion, and an annular limiting portion located inside the first socket housing and connected to the elastic pressing portion;
    a control block spring, placed inside the first socket housing and pressed against an inner wall of the first socket housing and one end of the control block away from the notch portion; and
    a socket housing cover, having a first end for inserting a plug assembly and a second end including an inner wall provided with an internal thread that matches the threaded connection portion.

2. The socket housing assembly according to claim 1, wherein a width of the control block is smaller than an axial length of the notch portion, and the socket housing assembly further comprises a limiting spacer placed between the first socket housing and the socket housing cover and pressed against the control block along the axial direction.

3. The socket housing assembly according to claim 1, further comprising a second socket housing, wherein a first end of the second socket housing is connected to a second end of the first socket housing, and a second end of the second socket housing is configured to connect to a socket base housing.

4. The socket housing assembly according to claim 1, wherein the annular limiting portion is made of sheet metal parts or stamped parts, and the elastic pressing portion and the annular limiting portion are connected by injection molding or embedded molding.

5. The socket housing assembly according to claim 1, wherein an inner wall of the first socket housing, on an side opposite to the notch portion, is provided with a positioning groove for positioning the control block spring, and/or a side of the annular limiting portion that is in contact with the control block spring is provided with a positioning protrusion for positioning the control block spring.

6. The socket housing assembly according to claim 1, further comprising multiple sets of limiting pillars placed inside the first socket housing to limit the annular limiting portion.

7. The socket housing assembly according to claim 6, wherein the multiple sets of limiting pillars comprises a pair of first limiting pillars located at two sides of an outer periphery of the annular limiting portion, a pair of second limiting pillars located at two sides of a bottom of an inner periphery of the annular limiting portion, and a pair of third limiting pillars located at two sides of a top of the inner periphery of the annular limiting portion;
    the third limiting pillars is configured to limit a lower limit position of the control block when the control block is pressed, and limit an upper limit position of the control block when the control block is released.

8. A fluid connector, comprising the plug assembly and a socket assembly, wherein the plug assembly comprises a plug base housing, a plug housing, a plug spring, and a plug sealing rod, the plug sealing rod is pressed between the plug base housing and the plug housing by the plug spring;

the socket assembly includes a socket base housing, a socket spring, a sealing block, and the socket housing assembly according to claim 1, the sealing block is pressed between the socket base housing and the socket housing assembly by the socket spring;

the plug housing is provided with a hollow guide pillar for inserting into the first socket housing, and an outer periphery of the hollow guide pillar is provided with an annular locking groove that locks with the annular limiting portion; when the hollow guide pillar is inserted into the first socket housing, the plug sealing rod and the sealing block move away from each other, thereby allowing conduction between the plug assembly and the socket assembly.

9. The fluid connector according to claim 8, wherein the plug base housing and the plug housing are connected by threads, and a first sealing ring is placed between the plug base housing and the plug housing, and a second sealing ring is placed between the plug sealing rod and the plug housing.

10. The fluid connector according to claim 8, wherein the socket housing assembly is provided with a second socket housing, two ends of the second socket housing are respectively connected to the first socket housing and the socket base housing by threads, a third sealing ring is placed between an inner periphery of a first end of the second socket housing and an outer periphery of a second end of the hollow guide pillar, a fourth sealing ring is placed between the second socket housing and the sealing block, and a fifth sealing ring is placed between the second socket housing and the socket base housing.

\* \* \* \* \*